United States Patent [19]

Malaczynski et al.

[11] Patent Number: 4,953,407

[45] Date of Patent: Sep. 4, 1990

[54] ION-DRAG FLOWMETER

[75] Inventors: Gerard W. Malaczynski, Bloomfield Hills; Thaddeus Schroeder, Rochester Hills, both of Mich.

[73] Assignee: General Motors Corporation, Detroit, Mich.

[21] Appl. No.: 229,873

[22] Filed: Aug. 8, 1988

[51] Int. Cl.$^5$ .............................................. G01F 1/56
[52] U.S. Cl. ................................................. 73/861.09
[58] Field of Search .................................... 73/861.09

[56] References Cited

U.S. PATENT DOCUMENTS

| 2,611,268 | 9/1952 | Mellen |           |
|-----------|--------|--------|-----------|
| 3,470,741 | 10/1969| Durbin |           |
| 3,706,938 | 12/1972| Petriw |           |
| 4,056,003 | 11/1977| Zizine | 73/861.09 |
| 4,393,719 | 7/1983 | Wiegand| 73/861.09 |

OTHER PUBLICATIONS

"A New Approach for Ionic Air Flow Sensors: Transit Time", R. Barriol, G. Hannoyer, C. Rousseau, SAE Technical Paper Series, No. 840138, 1984.
"Anemometric Characteristics of a Wire-to-Plane Electrical Discharge", K. J. Nygaard, Review of Scientific Instruments, vol. 36, No. 12, p. 1771, 1965.
"Corona Discharge Anemometer and its Operational Hypothesis", P. V. Desai, Review of Scientific Instruments, vol. 42, No. 5, p. 595, 1971.
Continuum Electromechanics, MIT Press, pp. 5.7-5.9, 1981.
"An Airspeed Vector Sensor for V/STOZ Aircraft", E. J. Durbin, vol. 19, No. 6, 1982.
"'Electric Wind' Gas Discharge Anemometer", K. J. Nygaard, Review of Scientific Instruments, vol. 36, No. 9, 1965.
Basic Processes of Gaseous Electronics, University of California Press, pp. 112-129, 1955.
"The Mobility of Ions in Air—II, Negative Ions in Moist Air", A. M. Tyndall and G. C. Grindley, Proceedings of the Royal Society, vol. A110, p. 341, 1926.
"The Mobility of Ions in Air—II, Positive Ions of Short Age", A. M. Tyndall and G. C. Grindley, Proceedings of the Royal Society, vol. A110, p. 538, 1926.
"The Mobility of Ions in Air—Ii, Air Containing Organic Vapors", A. M. Tyndall and G. C. Grindley, Proceedings of the Royal Society, vol. A111, p. 577, 1926.
"The Mobility of Alkalai Ions in Gases-IV, Measurements in Gaseous Mixtures", H. G. David and R. J. Munson, Proceedings of the Royal Society, vol. A177, p. 192, 1941.
"Electron and Negative Ion Mobilities in Oxygen, Air, Nitrous Oxide and Ammonia", Physical Review, vol. 51, p. 69, 1937.
"Air-Fuel Ratio Control in the Multiple Cylinder Engines", K. Itow and E. J. Durbin, Proceedings of the 18th IEEE Conference on Decision and Control—Symposium on Adaptive Processes, vol. 1, pp. 100-113, 1979.
"Ionic Fuel Control System Conversion to Operational Configuration", Department of Energy Research and Development Report, No. DE-FG01-791R10022000, 1979.

(List continued on next page.)

Primary Examiner—Herbert Goldstein
Attorney, Agent, or Firm—Tim G. Jaeger

[57] ABSTRACT

In an ion-drag flowmeter, an improvement is provided for alleviating the problem that the deflection of the ion stream may be altered dependent upon the concentration of polar molecules due to changes in the mobility of the ions caused by the clustering of polar molecules to the ions as result of collisions therebetween in which the polar molecules adhere to the ions. The improvement involves keeping the ambient electric field sufficiently weak that the clustering of polar molecules to the ions approaches a dynamic equilibrium in which thermal effects dominate electric field effects in promoting collisions between polar molecules and ions such that the mobility of the ions is substantially stabilized independent of the concentration of polar molecules.

15 Claims, 2 Drawing Sheets

OTHER PUBLICATIONS

"Electronic Fuel Injection Systems Utilizing Corona Discharge Air Mass Flow Transducers", M. H. Cops and J. H. Moore, SAE Technical Paper Series No. 770402, 1977.

"An Air Mass Flowmeter for Test Cell Instrumentation", 4th International Conference on Automotive Electronics, IEEE Conference Publication No. 29, pp. 20–26, 1983.

"A Worldwide Overview of Automotive Engine Control Sensor Technology", W. G. Wolber, SAE Technical Paper Series, No. 780207, p. 8, 1978.

"The Mobility of Alkalai Ions in Gasses—I, The Attachment of Water Molecules to Alkalai Ions in Gases", R. J. Munson and A. M. Tyndall, Proceedings of the Royal Society, vol. A172, p. 28, 1939.

Electronic and Ionic Impact Phenomena, vol. III, Slow Collisions of Heavy Particles, pp. 1932–2113, 1971.

Electrical Coronas: Their Basic Physical Mechanisms, L. B. Loeb, University of California Press, 1965.

"Corona—A Brief Status Report", C. F. Gallo, IEEE Transactions on Industry Applications, vol. IA–13, No. 6, p. 550, 1977.

Asymptotic Analysis of Corona Discharge from Thin Electrodes, E. J. Durbin, NASA Technical Paper No. 2645, 1986.

"On the Mechanism of Unimolecular Electron Capture", F. Bloch and N. E. Bradbury, Physical Review, vol. 48, p. 689, 1935.

Industrial Electrostatic Precipitation, H. J. White, Pergamon Press, pp. 74–125, 1963.

"Systematic Study of the Electrical Characteristics of the 'Trichel' Current Pulses from Negative Needle-to-Plane Coronas", W. L. Lama and C. F. Gallo, Journal of Applied Physica, vol. 45, No. 1, p. 103, 1974.

"The Sparking Characteristics of Needle-to-Plane Coronas", W. L. Lama and C. F. Gallo, IEEE Transactions on Industry Applications, vol. IA–12, No. 3, p. 288, 1976.

"Point-Source Corona Current Distribution in an External Field", L. F. Collins, S. A. Self, and D. D. Shearer, IEEE Transactions on Industry Applications, vol. , No. 6, p. 507, 1978.

ION-DRAG FLOWMETER

This invention relates to a gas flowmeter of the ion-drag type. More particularly, the invention relates to a method and apparatus for measuring the flow rate of a gas as a function of the deflection of an ion stream or cloud by collisions between the gas molecules and the ions. (1) "A New Approach for Ionic Air Flow Sensors: Transit Time", R. Barriol, G. Hannoyer, C. Rousseau, SAE Technical Paper Series, No. 840138, 1984; (2) "Anemometric Characteristics of a Wire-to-Plane Electrical Discharge", K. J. Nygaard, Review of Scientific Instruments, Vol. 36, No. 12, p. 1771, 1965; (3) "Corona Discharge Anemometer and Its Operational Hypothesis", P. V. Desai, Review of Scientific Instruments, Vol. 42, No. 5, p. 595, 1971; (4) Continuum Electromechanics, MIT Press, pp. 5.7-5.9, 1981; (5) "An Airspeed Vector Sensor for V/STOZ Aircraft", E. J. Durbin, Vol. 19, No. 6, 1982; (6) "'Electric Wind' Gas Discharge Anemometer", K. J. Nygaard, Review of Scientific Instruments, Vol. 36, No. 9, 1965.

In an ion-drag flowmeter, a problem can arise in that the deflection of the ion stream may be altered dependent upon the concentration of polar molecular constituents in the gas flow. This is due to changes in the mobility of the ions caused byy the clustering of polar molecules to the ions as a result of collisions therebetween in which the polar moleculars adhere to the ions. (7) Basic Processes of Gaseous Electronics, University of California Press, pp. 112-129, 1955; (8) "The Mobility of Ions in Air—II. Negative Ions in Moist Air", A. M. Tyndall and G. C. Grindley, Proceedings of the Royal Society, Vol. A110, p. 341, 1926; (9) "The Mobility of Ions in Air—II. Positive Ions of Short Age", A. M. Tyndall and G. C. Grindley, Proceedings of the Royal Society, Vol. A110, p. 538, 1926; (10) "The Mobility of Ions in Air—II. Air Containing Organic Vapors", A. M. Tyndall and G. C. Grindley, Proceedings of the Royal Society, Vol. A111, p. 577, 1926; (11) "The Mobility of Alkalai Ions in Gases—IV. Measurements in Gaseous Mixtures", H. G. David and R. J. Munson, Proceedings of the Royal Society, Vol. A177, p. 192, 1941; (12) "Electron and Negative Ion Mobilities in Oxygen, Air, Nitrous Oxide and Ammonia", Physical Review, Vol. 51, p. 69, 1937.

Where airflow is to be measured with an ion-drag meter, e.g., the intake airflow into an internal combustion engine, the air may well include polar molecules of water that will tend to cluster with the ions. This accounts for the undesirable sensitivity to humidity that has plagued prior ion-drag airflow meters. (13) "Air-Fuel Ratio Control in the Multiple Cylinder Engines", K. Itow and E. J. Durbin, Proceedings of the 18th IEEE Conference on Decision and Control—Symposium on Adaptive Processes, Vol. 1, pp. 100-113, 1979; (14) "Ionic Fuel Control System Conversion To Operational Configuration", Department of Energy Research and Development Report, No. DE-FG01-791R10022000, 1979; (15) "Electronic Fuel Injection Systems Utilizing Corona Discharge Air Mass Flow Transducers", M. H. Cops and J. H. Moore, SAE Technical Paper Series No. 770402, 1977; (16) "An Air Mass Flowmeter for Test Cell Instrumentation", 4th International Conference on Automotive Electronics, IEEE Conference Publication No. 229, pp. 20-26, 1983; (17) "A Worldwide Overview of Automotive Engine Control Sensor Technology", W. G. Wolber, SAE Technical Paper Series, No. 780207, p. 8, 1978.

In part, the present invention is based upon the observation that for small ratios of [electric field]/[gas pressure], the mobility of ions is independent of the concentration of polar (water) molecules. (18) "The Mobility of Alkalai Ions in Gasses—I. The Attachment of Water Molecules to Alkalai Ions in Gases", R. J. Munson and A. M. Tyndall, Proceedings of the Royal Society, Vol. A172, p. 28, 1939; (19) Electronic and Ionic Impact Phenomena, Vol. III, Slow Collisions of Heavy Particles, pp. 1932-2113, 1971. In one aspect of the invention, the previously described problem of ion-drag flowmeter sensitivity to the concentration of polar (water) molecules in the gas (air) is alleviated by keeping the ambient electric field strength sufficiently low that the clustering of polar (water) molecules to the ions approaches a dynamic equilibrium, i.e., [ion+$nH_2O$]+$H_2O$⟵⟶[ion+$(n+1)H_2O$], in which thermal effects dominate electric field effects in promoting collisions between the polar (water) molecules and the ions. As a result, the mobility of the ions is substantially stabilized independent of the concentration of the polar molecules in the gas (humidity). Preferably, the ratio [electric field]/[gas pressure] is limited to less than about two [volts/centimeter]/[torr].

It is common in ion-drag flowmeters to generate the ion stream or cloud via a corona discharge between a source electrode and a collector electrode. Pursuant to the preceding aspect of the invention, the corona discharge should be controlled so as to keep the associated electric field sufficiently low to avoid sensitivity to the concentration of polar molecules in the gas. This can be accomplished, according to a further aspect of the invention, by limiting the corona discharge current to about one microamp or less. As a result, the electric field associated with the discharge is correspondingly lowered. Further, the quantity of generated ions is reduced so that the electric field produced by the space charge of the ions is likewise reduced. (20) Electrical Coronas: Their Basic Physical Mechanisms, L. B. Loeb, University of California Press, 1965; (21) "Corona—A Brief Status Report". C. F. Gallo, IEEE Transactions on Industry Applications, Vol. IA-13, No. 6, p. 550, 1977; (22) Asymptotic Analysis of Corona Discharge From Thin Electrodes, E. J. Durbin, NASA Technical Paper No. 2645, 1986.

In another aspect of the invention, the corona discharge is negative. This is especially advantageous in the ion-drag measurement of the airflow inducted into an internal combustion engine because (absent electronegative air contaminants) only oxygen ions are produced in the discharge so that the resultant measurement is of the oxygen flow rate which is the precise parameter of interest in respect to the combustion process. (23) "On the Mechanisms of Unimolecular Electron Capture", F. Bloch and N. E. Bradbury, Physical Review, Vol. 48, p. 689, 1935; (24) Industrial Electrostatic Precipitation, H. J. White, Pergamon Press, pp. 74-125, 1963.

According to a further aspect of the invention, the desired weak electric field is produced by a source and collector electrode configuration in which a pointed tip of the source electrode protrudes somewhat beyond an adjacent substantially planar portion of the corresponding collector electrode for localizing the corona discharge and associated high-intensity electric field to the immediate vicinity of the source electrode tip. (25)

"Systematic Study of the Electrical Characteristics of the 'Trichel' Current Pulses from Negative Needle-to-Plane Coronas", W. L. Lama and C. F. Gallo, Journal of Applied Physics, Vol. 45, No. 1, p. 103, 1974; (26) "The Sparking Characteristics of Needle-to-Plane Coronas, W. L. Lama and C. F. Gallo, IEEE Transactions on Industry Applicatons, Vol. IA-12, No. 3, p. 288, 1976; (27) "Point-Source Corona Current Distribution in an External Field", L. F. Collins, S. A. Self, and D. D. Shearer, IEEE Transactions on Industry Applications, Vol., No. 6, p. 507, 1978. Moreover, within the context of an ion-drag flowmeter, the foregoing pointed tip configuration for the source electrode provides additional advantages over other possible source electrode configurations (e.g., a wire or a disc) related to less power consumption, lower energizing voltage level, greater durability, lower cost, less obstruction to gas flow, and more compatibility with a negative corona discharge.

In yet another aspect of the invention, two collector electrodes are provided for measuring the gas flow rate as a function of the difference between the ion currents collected by the respective electrodes. (28) U.S. Pat. No. 2,611,268; (29) U.S Pat. No. 3,470,741; (30) U.S. Pat. No. 3,706,938. Preferably, the gas flow rate is given by the expression: $m(i_2-i_1)/(i_1+i_2)$ where $i_1$ and $i_2$ are the currents collected by the respective collector electrodes and m is a constant such that the current difference $(i_2-i_1)$ is normalized by the total current $(i_1+i_2)$. Reference (18). In one embodiment, each collector electrode is in the form of a hollow cylinder through which the gas flow passes. In another embodiment, each collector electrode is in the form of a planar insulator covered by a conductive layer over which the gas flow passes.

Pursuant to an additional aspect of the invention, two source and collector electrode pairs are spaced apart along the gas flow path to generate dual ion streams or clouds for providing bidirectional gas flow measurement.

In a still further aspect of the invention, a supplemental collector electrode includes a porous structure (e.g., a honeycell lattice) through which the gas flow passes thereby improving ion collection efficiency.

The foregoing and other aspects and advantages of the invention may be best understood by reference to the following detailed description when taken in conjunction with the accompanying drawing in which.

Figure 1:
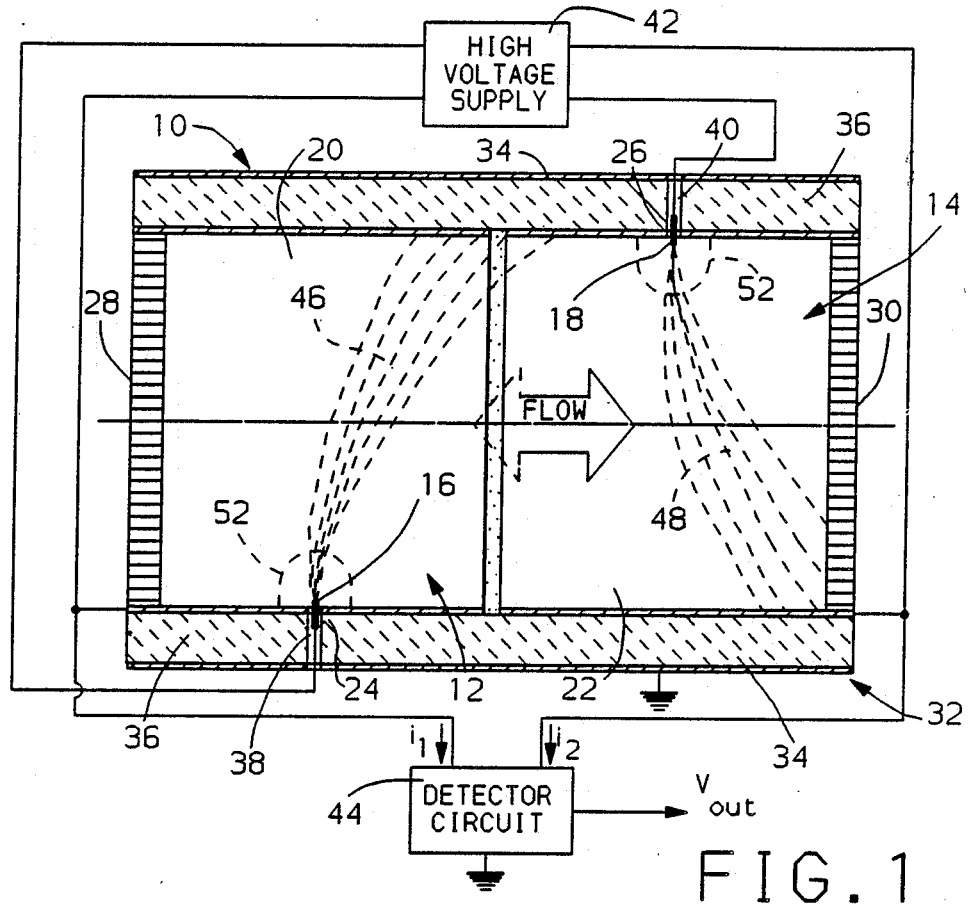
FIG. 1 is a diagram of one embodiment of the invention in which the ion-drag flow transducer is shown in cross-section.

Referring to FIG. 1, a flowmeter of the ion-drag type is provided for measuring the mass flow of a gas. The gas flows axially through a transducer 10 comprising first and second electrode assemblies 12 and 14. Specifically, the electrode assemblies 12 and 14 include source electrodes 16 and 18 and collector electrodes 20 and 22, respectively. The source electrodes 16 and 18 are needle-like in configuration, terminating in pointed tips. The collector electrodes 20 and 22 are hollow-cylindrical in configuration, having apertures 24 and 26 through which the pointed tips of the source electrodes 16 and 18 protrude slightly. Of course, the source electrodes 16 and 18 are electrically isolated from the colector electrodes 20 and 22.

The electrode assemblies 12 and 14 also include supplemental collector electrodes 28 and 30 in the form of porous structures mounted across the outer ends of the primary collector electrode cylinders 20 and 22. Preferably, the supplemental collector electrodes 28 and 30 have a honeycell lattice through which the gas flow as it enters and exits the transducer 10. On entry, the honeycell structures 28 and 30 help to direct the gas flow axially through the transducer 10.

The electrode assemblies 12 and 14 are contained within a housing 32 formed by a conductive outer shell 34 and an inner liner 36 of insulation. The source electrodes 16 and 18 extend through the insulator 36 and outside the housing 28 through apertures 38 and 40 in the outer shell 34. Preferably, the electrode assemblies 12 and 14 are identical in configuration, except that one is effectively rotated 180° with respect to the other (for reasons that will be more fully explained later). The outer shell 34 of the housing 32 is grounded.

A high voltage supply 42 is connected between the source electrodes 16 and 18 and the primary collector electrodes 20 and 22, respectively. A detector circuit 44 is connected between each of the primary collector electrodes 20 and 22 and ground. Of course, the supplemental collector electrodes 28 and 30 are electrically connected with the primary collector electrodes 20 and 22, respectively.

In operation, the high voltage supply 42 is effective to generate a corona discharge between the source electrodes 16 and 18 and the collector electrodes 20 and 22, respectively. As a result, dual ion streams 46 and 48 are produced. In the presence of a gas flow, the ion streams 46 and 48 are deflected in the direction of the flow by collisions between the ions and molecules of the flowing gas. The deflected ions are collected by the primary collector electrodes 20 and 22 (and to some extent by the supplemental collector electrodes 28 and 30). As depicted in FIG. 1, the ion streams 46 and 48 are in idealized form. In actual practice, the streams 46 and 48 may be more dispersed, resembling clouds more than beams. In any event, the 180° phase displaced symmetry of the electrode assemblies 12 and 14 helps to minimize interaction between the ion streams 46 and 48.

The ions collected by the electrodes 20/28 and 22/30 form collectur currents $i_1$ and $i_2$, respectively. Assuming the gas flow is forom left to right through the transducer 10, a greater portion of the generated ions are collected by the downstream collector electrodes 22/30 than by the upstream collector electrodes 20/28. Accordingly, the downstream collector current $i_2$ will be larger than the upstream collector current $i_1$. The difference in the currents $i_1$ and $i_2$ is a measure of the mass flow rate of the gas. The higher the gas flow rate, the greater the deflection of the ion streams 46 and 48, and the larger the difference between the collector currents $i_1$ and $i_2$. As will be more fully explained later, the detector circuit 42 senses the collector current difference $(i_2-i_1)$ and produces an output voltage $V_o$ indicative of the mass flow rate of the gas.

In an ion-drag flowmeter such as that illustrated in FIG. 1, a problem can arise in that the degree of of deflection of the ion streams or clouds 46 and 48 may be altered dependent upon the concentration of polar molecule constituents in the gas flow. This is caused by the clustering of polar molecules to the ions as a result of collisions therebetween in which the polar molecules adhere to the ions and decrease their mobility. References (7)-(12). The sensitivity to humidity that has been experienced in prior ion-drag airflow meters results from this clustering of polar water molecules to the ions. References (13)-(17). The present invention alleviates this problem.

In part, the invention is based upon the observation that for small ratios of [electric field]/[gas pressure], the mobility of ions is independent of the concentration of constituent polar (water) molecules. References (18)-(19). According to the invention, the ambient electric field should be kept sufficiently weak that the clustering of polar (water) molecules to the ions approaches a dynamic equilibrium, of the form [ion+$nH_2O$]+$H_2O \leftrightarrow$ [ion+$(n+1)H_2O$], in which thermal effects dominate electric field effects in generating collisions between polar (water) molecules and the ions. As a result, the mobility of the ions is substantially stabilized independent of the concentration of polar molecules in the gas (humidity is related to the concentration of water molecules in the air). Preferably, the ratio [E=electric field]/[p=gas pressure] is limited to less than about two [volts/centimeter]/[torr].

Figure 2:
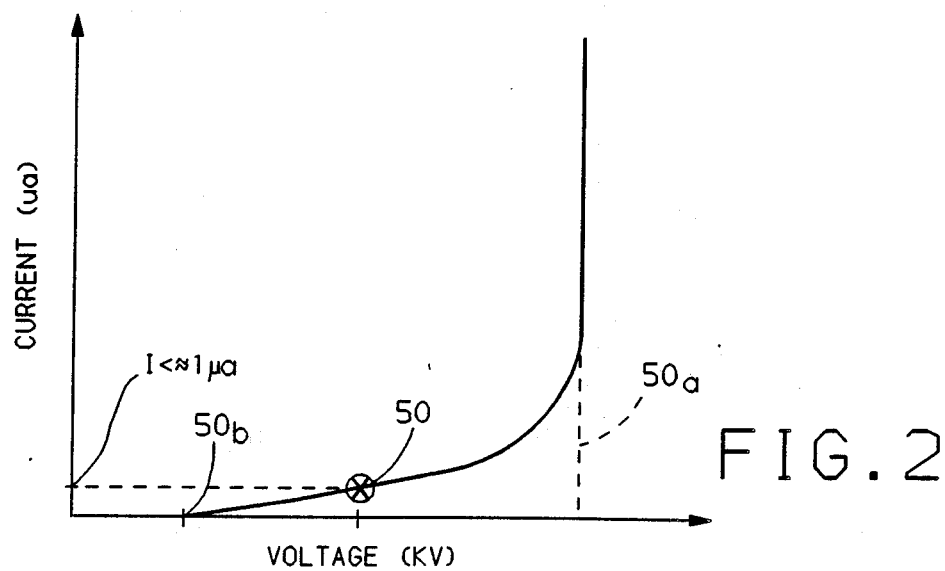
FIG. 2 is a graph of a negative corona discharge characteristic useful in explaining the operation of one aspect of the invention.

In one aspect of the invention, the desired low electric field is achieved by limiting the corona discharge current to about one microamp or less. Specifically, assuming a negative corona discharge as shown in FIG. 2, the operating point 50 of the discharge is located below the breakdown voltage 50a and as close as possible to the onset of corona 50b. References (20)-(22). As a result, the electric field associated with the discharge is correspondingly lowered. Further, the quantity of generated ions is reduced so that the electric field produced by the space charge of the ions is also reduced. Regardless how the ions are generated, whether in a corona discharge or from some other source, the invention contemplates that the number of ions will be sufficiently small that the electric field due to the space charge of the ions will be appropriately weak.

The use of a negative corona discharge is particulary advantageous in the ion-drag measurement of air flow inducted into an internal combustion engine. This is because (absent electronegative air contaminants) only oxygen ions are produced in the discharge so that the resultant measurement is of the oxygen mass flow rate. Oxygen is of course precisely the element of interest in the combustion process of the engine. References (23)-(24).

In another aspect of the invention, the desired weak electric field is facilitated by the specific source and collector electrode configurations shown in FIG. 1. In particular, the source electrodes 16 and 18 each have a pointed tip that protrudes somewhat beyond the adjacent substantially planar portion of the companion collector electrodes 20 and 22, respectively. References (25)-(27). As a result, the corona discharge and associated high-intensity electric field is largely confined to a relatively small volume 52 immediately surrounding the pointed tip of the source electrodes 16 and 18. Outside the regions 52, the electric field is appropriately weak. Preferably, the source electrodes 16 and 18 are located as far upstream as possible from the associated downstream one of the collector electrodes 20 and 22 consistent with the requirement that some ions must be collected on the downstream one of the collector electrodes 20 and 22 at the lowest gas flow rate to be measured. Beyond confining the high-intensity electric field to the regions 52, the pointed tip configuration of the source electrodes 16 and 18 yields additional advantages over alternative electrode configurations (e.g., a wire or a disc) in terms of less consumption, lower energizing voltage, greater durability, lower cost, less obstruction to gas flow, and easier implementation with a negative corona discharge.

It will now be appreciated that with a negative corona discharge operating near the corona onset point 50b as shown in FIG. 2, and with the associated high-intensity electric field confined to the relatively small volumes 52 about the source electrode tips as shown in FIG. 1, the ion beams 46 and 48 each contain a smaller number of ions than would be conventionally generated. Consequently, it is important that the ion collection efficiency be as high as possible. The supplemental collector electrodes 28 and 30 are of help in this regard since they are able to collect ions that would otherwise be swept past the primary collector electrodes 20 and 22 and out of the transducer 10. In this way, the honeycell electrodes 28 and 30 serve to extend the dynamic range of the FIG. 1 flowmeter to higher gas flow rates than would otherwise be possible.

Figure 3:
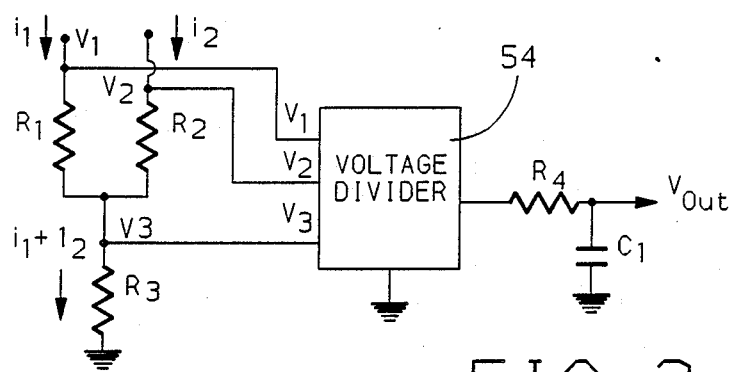
FIG. 3 is a diagram of a preferred embodiment of the detector circuit shown in FIG. 1.

Referring to FIG. 3, a preferred embodiment of the detector circuit 44 produces an output voltage $V_0$ which is a function of the collector currents $i_1$ and $i_2$ as follows:

$$V_o = m(i_2 - i_1)/(i_1 + i_2) \qquad [B\ 1]$$

where m is a conversion constant. As previously explained, the difference between the collector currents $i_2$ and $i_1$ is a measure of the mass flow rate of the gas. However, the total number of ions generated and contributing to the collector currents $i_1$ and $i_2$ is influenced by the gas velocity and several other factors including fluctuations in the high voltage supply and changes in the gas pressure and temperature. Accordingly, in order to eliminate these influences in the FIG. 3 embodiment of the detector circuit 44, the current difference $(i_2 - i_1)$ is normalized with respect to the total current $(i_1 + i_2)$.

Referring to FIG. 3, an analog voltage divider 54 (which may be an AD535 from Analog Devices, Inc.) has voltage inputs $V_1$, $V_2$ and $V_3$ for producing an output voltage $V_o$ as follows:

$$V_o = (V_2 - V_1)/V_3 \qquad [2]$$

A network of resistors $R_1$, $R_2$ and $R_3$ is provided for defining the voltages $V_1$, $V_2$ and $V_3$ as follows:

$$V_1 = i_1/R_3 \qquad [3]$$

$$V_2 = i_2/R_2 \qquad [4]$$

$$V_3 = (i_1 + i_2)/R_3 \qquad [5]$$

Provided that $R_1 = R_2 = R_3 = mR$, the simultaneous solution of expressions [2] through [5] yields expression [1]. The detector circuit 44 also includes a filter provided by resistor $R_4$ and capacitor $C_1$ for filtering out Trichel pulses resulting from the negative corona discharge. Reference (25).

Figure 4:
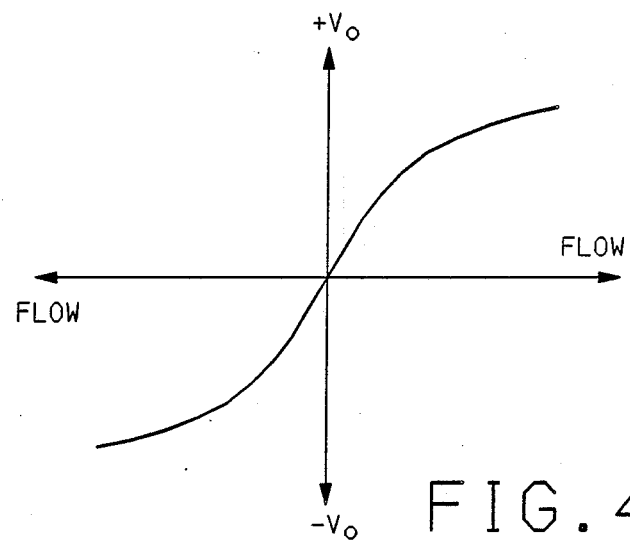
FIG. 4 is a graph of the output voltage versus flow rate for the detector circuit embodiment shown in FIG. 3.

A significant feature of the ion-drag flowmeter shown in FIG. 1 is that it is bidirectional in respect to gas flow. Although the operation of the FIG. 1 meter was previously described under the assumption that the gas flow was from left to right through the transducer 10, the gas flow can just as well be from right to left. This bidirectional nature of the FIG. 1 flowmeter is illustrated in FIG. 4 which is a graph of the output voltage $V_o$ of the detector circuit 44 as a function of the direction and magnitude of the gas flow through the transducer 10. Note that the voltage $V_o$ passes through zero and changes polarity as the gas flow changes direction. The shape of the FIG. 4 graph can be influenced by the axial positioning of the electrodes 16 and 18 and by the distance that they protrude above the surrounding planar portions of the respective collector electrodes 20 and 22.

It is to be understood that the several advantages of the invention as previously described in respect to the bidirectional flowmeter of FIG. 1 are also applicable to unidirectional flow-meters The FIG. 1 flowmeter can be converted from bidirectional to unidirectional by eliminating the appropriate one of the source electrodes 16 and 18 depending upon the direction of the gas flow to be measured.

Figure 5:
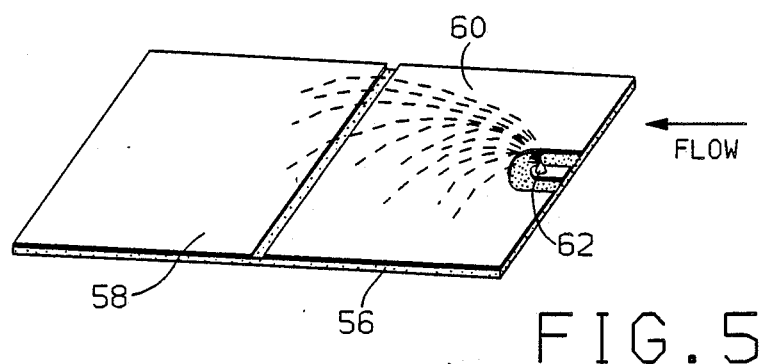
FIG. 5 is an alternative embodiment of the transducer electrode assembly of the invention.

FIG. 5 illustrates an alternative to the hollow-cylindrical collector electrodes 20 and 22 of FIG. 1. In particular, a planar insulator substrate 56 supports flat collector electrodes 58 and 60 and pointed-tip source electrode 62. The collector electrodes 58 and 60, as well as the pointed-tip source electrode 62, may be formed on the insulator 56 by surface metallization techniques. The entire assembly is adapted to be mounted such that the gas flow passes first over the tip of the source electrode 62 and then successively over the surfaces of the collector electrodes 58 and 60. The result is a unidirectional flowmeter. A bidirectional flowmeter can be achieved by adding another source electrode 62 (not shown) at the other end of the FIG. 5 assembly, or by providing two FIG. 5 assemblies mounted face-to-face with the source electrodes 62 at opposite ends.

What is claimed is:

1. In a method for measuring the flow rate of a gas including a variable concentration of polar molecules, the method involving the steps of:
    generating a stream of ions that is deflected by the gas flow wherein the amount of deflection is dependent upon the concentration of polar molecules in the gas, and
    sensing the degree of deflection of the ion stream to provide a measure of the gas flow rate,
an improvement comprising the additional step of:
    keeping the ambient electric field sufficiently weak that the deflection of the ion stream is rendered independent of the concentration of polar molecules in the gas.

2. The method of claim 1 in which the gas is air and the polar molecules are water molecules.

3. The method of claim 1 in which the ion stream is composed of negative ions generated by a corona discharge.

4. The method of claim 1 in which the ratio E/p is less than about two where E is the electric field in volts per centimeter and p is the gas pressure in torr.

5. The method of claim 3 in which the corona discharge has a current of about one microamp.

6. The method of claim 5 in which the operating point of the corona discharge is located at the point of corona onset.

7. In apparatus for measuring the flow rate of a gas including a variable concentration of polar molecules, the apparatus comprising:
    means for producing a corona discharge to generate a stream of ions that is deflected by the gas flow wherein the amount of deflection is dependent upon the concentration of polar molecules in the gas, and
    means for collecting the deflected ions to sense the degree of deflection of the ion stream as a measure of the gas flow rate,
an improvement comprising:
    means for controlling the corona discharge so as to maintain the ambient electric field low enough that the deflection of the ion stream is rendered independent of the concentration of polar molecules in the gas.

8. The apparatus of claim 7 including a source and collector electrode configuration in which a pointed tip of the source electrode protrudes slightly beyond an adjacent substantially planar portion of the companion collector electrode for producing a corona discharge therebetween in which the discharge and the associated high-intensity electric field are localized about the source electrode tip.

9. The apparatus of claim 7 including two collector electrodes for measuring the gas flow rate as a function of the difference between the ion currents collected by the respective collector electrodes.

10. The apparatus of claim 7 including two source and collector electrode pairs spaced apart along the gas flow path to provide dual ion streams for yielding bidirectional gas flow measurement.

11. The apparatus of claim 8, 9 or 10 in which a supplemental collector electrode includes a porous structure through which the gas flow passes for improving ion collection efficiency.

12. The apparatus of claim 8, 9 or 10 in which a collector electrode is in the form of a hollow cylinder through which at least a portion of the gas flow passes.

13. The apparatus of claim 8, 9 or 10 in which a collector electrode is in the form of a planar insulator covered by a conductive layer over which at least a portion of the gas flow passes.

14. The apparatus of claim 9 or 10 in which the measured gas flow rate is given by the expression: $m(i_2-i_1)/(i_2+i_1)$ where $i_2$ and $i_1$ are the ion currents collected by the respective collector electrodes and m is a constant such that the current difference $(i_2-i_1)$ is normalized in respect to the total current $(i_2+i_1)$.

15. The apparatus of claim 7 in which the corona discharge is negative and means are provided for filtering out Trichel pulses in effecting the gas flow measurement.

* * * * *